United States Patent
Khosrowpour

[19]

[11] Patent Number: 5,991,844
[45] Date of Patent: Nov. 23, 1999

[54] REDUNDANT BUS BRIDGE SYSTEMS AND METHODS USING SELECTIVELY SYNCHRONIZED CLOCK SIGNALS

[75] Inventor: Farzad Khosrowpour, Lyons, Colo.

[73] Assignee: Adaptec, Inc., Longmont, Colo.

[21] Appl. No.: 09/062,282

[22] Filed: Apr. 17, 1998

[51] Int. Cl.$^6$ .............................. G06F 13/00; G06F 13/42; G06F 1/04; H04L 7/00

[52] U.S. Cl. .......................... 710/129; 710/128; 713/400; 713/501; 370/285; 370/402

[58] Field of Search ...................................... 710/128, 129, 710/126, 101, 100, 131, 33, 60, 106; 709/232; 713/501, 503, 400; 714/1, 4; 395/559; 370/402, 285, 466; 375/219; 327/141

[56] References Cited

U.S. PATENT DOCUMENTS

| | | | |
|---|---|---|---|
| 5,210,858 | 5/1993 | Jensen et al. | 713/401 |
| 5,434,996 | 7/1995 | Bell | 713/400 |
| 5,838,995 | 11/1998 | Chen et al. | 710/60 |

*Primary Examiner*—Gopal C. Ray

*Attorney, Agent, or Firm*—Duft, Graziano & Forest, P.C.

[57] ABSTRACT

A redundant bus bridge system for communicating between a first bus and a second bus includes a first clock generator operative to produce a first clock signal and a second clock generator operative to produce a second clock signal. A first bus bridge, e.g., a first RAID controller, connects the first bus and the second bus and is responsive to the first clock generator and the second clock generator. The first bus bridge is operative to transfer data between the first bus and the second bus in synchronism with a selected one of the first clock signal and the second clock signal. A second bus bridge, e.g., a second RAID controller, connects the first bus and the second bus and is responsive to the first clock generator and the second clock generator. The second bus bridge is operative to transfer data between the first bus and the second bus in synchronism with a selected one of the first clock signal and the second clock signal. According to aspects of the present invention, the first bus bridge is operative to transfer data between the first bus and the second bus in synchronism with the second clock signal when the second bus bridge is operational, and the first bus bridge is operative to transfer data between the first bus and the second bus in synchronism with the first clock signal when the second bus bridge is non-operational.

27 Claims, 6 Drawing Sheets

REDUNDANT BUS BRIDGE SYSTEMS AND METHODS USING SELECTIVELY SYNCHRONIZED CLOCK SIGNALS

BACKGROUND OF THE INVENTION

1. Field of the Invention

The present invention relates to data communications systems and methods, and more particularly, to bus bridge systems and methods.

2. Statement of the Problem

High-bandwidth busses are typically used to communicate between hosts and peripherals in applications such as computer networks. The bus interfaces used by hosts and peripherals often take different forms depending on the performance characteristics desired. For example, host devices may communicate via a differential or single-ended Small Computer System Interface (SCSI) or a Fibre Channel (FC) interface, while a peripheral such as a disk array may utilize a SCSI or other bus interface. When hosts and peripherals use disparate bus architectures, bus bridges are often utilized to provide connectivity.

Bus bridges may also be used to increase the capacity of bus systems. Bus specifications often limit, among other things, the length of the bus and the number of devices that may be attached to the bus in order to maintain performance. For example, the Peripheral Component Interconnect (PCI) bus specification commonly employed in personal computer bus applications has detailed rules for round trip propagation delay and capacitive loading which help maintain the integrity of communications at specified bus clock rates. In order to increase the capacity of such a bus, an expanded multi-layer bus structure may be used that includes a plurality of busses connected by high-speed bus bridges. This multi-layer structure can allow an increased number of devices to be interconnected while maintaining bus performance.

Complex computer systems and networks may employ multiple hosts connected to peripherals such as mass storage devices. These devices often are connected to the hosts by multiple busses and bus bridges. Consequently, data stored on these mass storage systems may be temporarily inaccessible due to a bus bridge failure, an event that can incur significant down time costs. In addition, systems that utilize bridges with storage elements, such as caches used in for Redundant Array of Independent Disk (RAID) systems that implement data striping or mirroring across multiple disks or other storage media, may be subject to data loss or corruption if the coherence of the cache is lost due to a bridge failure. Accordingly, it is desirable to increase the reliability of bus bridges to help reduce the likelihood of information loss.

SUMMARY OF THE INVENTION

In light of the foregoing, it is an object of the present invention to provide bus bridge systems and methods that can provide increased reliability and data protection.

This and other objects, features and advantages are provided according to the present invention by bus bridge systems and methods in which first and second clock generators produce respective first and second clock signals, and wherein each of first and second bus bridges transfer data between first and second busses in synchronism with a selected one of the first and second clock signals. According to an aspect of the present invention, the first bus bridge may transfer data in synchronism with the second clock signal when the second bus bridge is operational or when the second clock signal is valid, but changes to transfer data in synchronism with the first clock signal when the second bus bridge becomes non-operational or the second clock signal becomes invalid. In one embodiment, first and second selective clock synchronizing circuits produce respective first and second synchronized clock signals, and the first and second bus bridges are responsive to the respective ones of the first and second synchronized clock signals. According to another aspect of the present invention, the first bus bridge, the first clock generator and the first selective clock synchronizing circuit are included in a first circuit assembly, and the second bus bridge, the second clock generator and the second selective clock synchronizing circuit are included in a second circuit assembly. According to yet another aspect, a conductor assembly, e.g., a passive backplane, connects the first and second circuit assemblies, conveying the first clock signal from the first circuit assembly to the second circuit assembly and the second clock signal from the second circuit assembly to the first circuit assembly.

Clock signals provided according to the present invention can increase reliability of a bus bridge system, particularly a bus bridge system in which redundant bus bridges operate in a synchronous fashion, such as a system utilizing mirrored caching to maintain cache coherency in the event of a failure of a bus bridge in the redundant system. A first bus bridge on a first circuit assembly can be switched from a remote clock signal generated on a second bus bridge circuit assembly to a locally-generated clock signal, should the second bus bridge circuit assembly become non-operational or should the remote clock signal become invalid, as might occur, for example, when the second circuit assembly is removed for repair or replacement.

In particular, according to the present invention, a redundant bus bridge system for communicating between a first bus and a second bus includes a first clock generator operative to produce a first clock signal and a second clock generator operative to produce a second clock signal. A first bus bridge, e.g., a first RAID controller, connects the first bus and the second bus and is responsive to the first clock generator and the second clock generator. The first bus bridge is operative to transfer data between the first bus and the second bus in synchronism with a selected one of the first clock signal and the second clock signal. A second bus bridge, e.g., a second RAID controller, connects the first bus and the second bus and is responsive to the first clock generator and the second clock generator. The second bus bridge is operative to transfer data between the first bus and the second bus in synchronism with a selected one of the first clock signal and the second clock signal. According to aspects of the present invention, the first bus bridge is operative to transfer data between the first bus and the second bus in synchronism with the second clock signal when the second bus bridge is operational, and the first bus bridge is operative to transfer data between the first bus and the second bus in synchronism with the first clock signal when the second bus bridge is non-operational.

In one embodiment according to the present invention, a first selective clock synchronizing circuit is configured to receive the first clock signal and the second clock signal and operative to produce a first synchronized clock signal synchronized to one of the first clock signal and the second clock signal. A second selective clock synchronizing circuit is configured to receive the first clock signal and the second clock signal and operative to produce a second synchronized clock signal synchronized to one of the first clock signal and the second clock signal. The first bus bridge is configured to receive the first synchronized clock signal and operative to transfer data between the first bus and the second bus responsive thereto. The second bus bridge is configured to receive the second synchronized clock signal and operative to transfer data between the first bus and the second bus responsive thereto. According to an aspect of the present invention, the first selective clock synchronizing circuit is operative to synchronize the first synchronized clock signal to the second clock signal when the second bus bridge is operational, and the first selective clock synchronizing means is operative to synchronize the first synchronized clock signal to the second clock signal when the second bus bridge is non-operational. According to another aspect, the first selective clock synchronizing circuit is operative to synchronize the first synchronized clock signal to the second clock signal when the second clock signal is valid and to synchronize the first synchronized clock signal to the second clock signal when the second clock signal is invalid.

In another embodiment according to the present invention, the first selective clock synchronizing circuit includes a phase-locked loop configured to receive an applied clock signal and operative to synchronize the first synchronized clock signal thereto. A switch is configured to receive the first clock signal and the second clock signal and operative to selectively apply one of the first clock signal and the second clock signal to the phase-locked loop. The first selective clock synchronizing circuit may further include a clock status monitoring circuit operative to determine a status of the second clock signal and to produce a command signal in based on the determined status of the second clock signal, with the switch being responsive to the command signal to apply one of the first clock signal and the second clock signal to the phase-locked loop.

In another embodiment according to the present invention, a first circuit assembly includes the first bus bridge, the first clock generator and the first selective clock synchronizing circuit. A second circuit assembly includes the second bus bridge, the second clock generator and the second selective clock synchronizing circuit. A conductor assembly, e.g., a backplane, connects the first circuit assembly and the second circuit assembly such that the first clock signal is conveyed from the first circuit assembly to the second circuit assembly and the second clock signal is conveyed from the second circuit assembly to the first circuit assembly.

In yet another embodiment according to the present invention, a data bus connects the first bus bridge and the second bus bridge. The first bus bridge and the second bus bridge are operative to transfer data therebetween over the data bus in synchronism with a selected one of the first clock signal and the second clock signal. The first bus bridge may include a first cache responsive to the first synchronized clock signal and operative to cache data transfers between the first bus and the second bus, and the second bus bridge may include a second cache responsive to the second synchronized clock signal and operative to cache data transfers between the first bus and the second bus. The data bus may connect the first and second caches.

According to method aspects of the present invention, a first clock signal is generated on a first circuit assembly, and a second clock signal is generated on a second circuit assembly. Data is transferred data over a first bus bridge in the first circuit assembly and over a second bus bridge in the second circuit assembly in synchronism with a selected one of the first clock signal and the second clock signal. According to one aspect, data is transferred over the first bus bridge in synchronism with the second clock signal when the second bus bridge is operational, and data is transferred over the first bus bridge in synchronism with the second clock signal when the second bus bridge is non-operational. More reliable bus bridge operation can thereby be provided.

DETAILED DESCRIPTION OF EMBODIMENTS

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

It will be understood that as referred to herein, a "bus" may include a conductive, fiber optic or similar pathway for transmission of information from one location to another. For purposes of the discussion herein, busses include but are not limited to parallel and series data paths such as low-voltage differential (LVDS) or single-ended (SE) SCSI, Fibre Channel (FC) and the like. A "bus bridge" according to the present invention may include hardware or combinations of hardware and software that provide connectivity between such busses. Accordingly, a bus bridge may include intermediate busses or other data paths that are used to provide connectivity between busses; for example, embodiments are described herein that include bus bridges including intermediate busses, e.g., PCI busses, which are used to provide connectivity between two other types of busses, such as between a Fibre Channel "bus" and an SCSI bus. It will also be understood that, as used herein, a signal transition, data transfer or similar event that occurs "in synchronism with" or "synchronized to" a reference clock signal refers to relationships in which the operation or event referred to exhibits a temporal dependence upon the reference clock signal, for example, responsive to a second clock or other signal generated from the reference clock signal.

Figure 1:
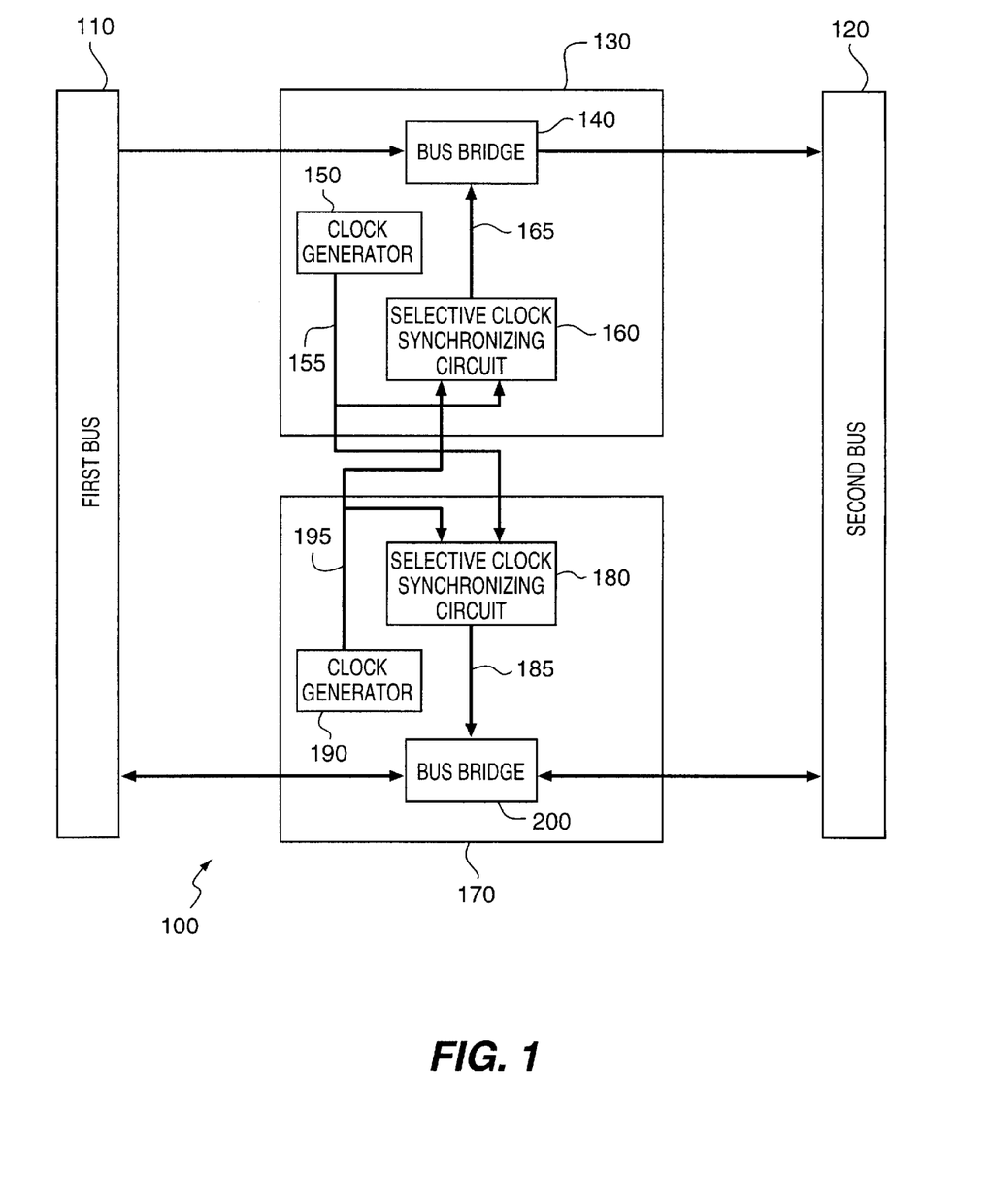
FIG. 1 illustrates an embodiment of a redundant bus bridge system according to the present invention.

FIG. 1 illustrates a bus bridge system 100 according to the present invention, including a first bus bridge 140 and a second bus bridge 200. A first clock generator 150, e.g., a oscillator circuit, produces a first clock signal 155. Similarly, a second clock generator 190 produces a second clock signal 195. A first selective clock signal synchronizing circuit 160 receives the first and second clock signals 155, 195 and produces a first synchronized clock signal 165 that is synchronized to a selected one of the first and second clock signals 155, 195. The first bus bridge 140 transfers data between a first bus 110 and a second bus 120 responsive to the first synchronized clock signal 165. A second selective clock signal synchronizing circuit 180 also receives the first and second clock signals 155, 195, and produces a second synchronized clock signal 185 that is synchronized to one of the first and second clock signals 155, 195. The second bus bridge 200 transfers data between the first and second busses 110,120 responsive to the second synchronized clock signal 185.

In an embodiment according to the present invention, the first bus bridge 140, the first clock generator 150 and the first selective clock synchronizing circuit 160 are included in a first circuit assembly 130, and the second bus bridge 200, the second clock generator 190 and the second selective clock synchronizing circuit 180 are included in a second circuit assembly 170. Under conditions in which the first and second bus bridges 140, 200 are concurrently operative to transfer data between the first and second busses 110, 120, the first and second clock synchronizing circuits 160, 180 produce respective first and second synchronized clock signals 165, 185 that are synchronized to the same one of the first and second clock signals 155, 195. To provide redundancy in the event of failure of components of the one of the first and second circuit assemblies 130, 170, the first and second selective clock synchronizing circuits 160, 180 are operative to synchronize their respective synchronized clock signal outputs 165, 185 to the locally generated clock such that the local bus bridge circuit may remain operational.

Those skilled in the art will appreciate that the present invention is generally applicable to a variety of bus bridge applications. In an embodiment of a bus bridge system 100 illustrated in FIG. 2, bus bridge connectivity is provided between a Fibre Channel (FC) host 201 connected to a FC "bus" 110, and a disk array 204 connected to a SCSI bus 120. A first circuit assembly 130 includes a first bus bridge, here a first RAID controller 140 that implements data mirroring and striping according to one or more RAID levels as described, for example, in *The RAIDbook, A Source Book for Disk Array Technology*, published by the RAID Advisory Board, St. Peter Minn. (1996). Similarly, a second circuit assembly 170 includes a second bus bridge, e.g., a second RAID controller 200. The first and second circuit assemblies 130, 170 are releasably connected to a backplane 230.

Figure 2:
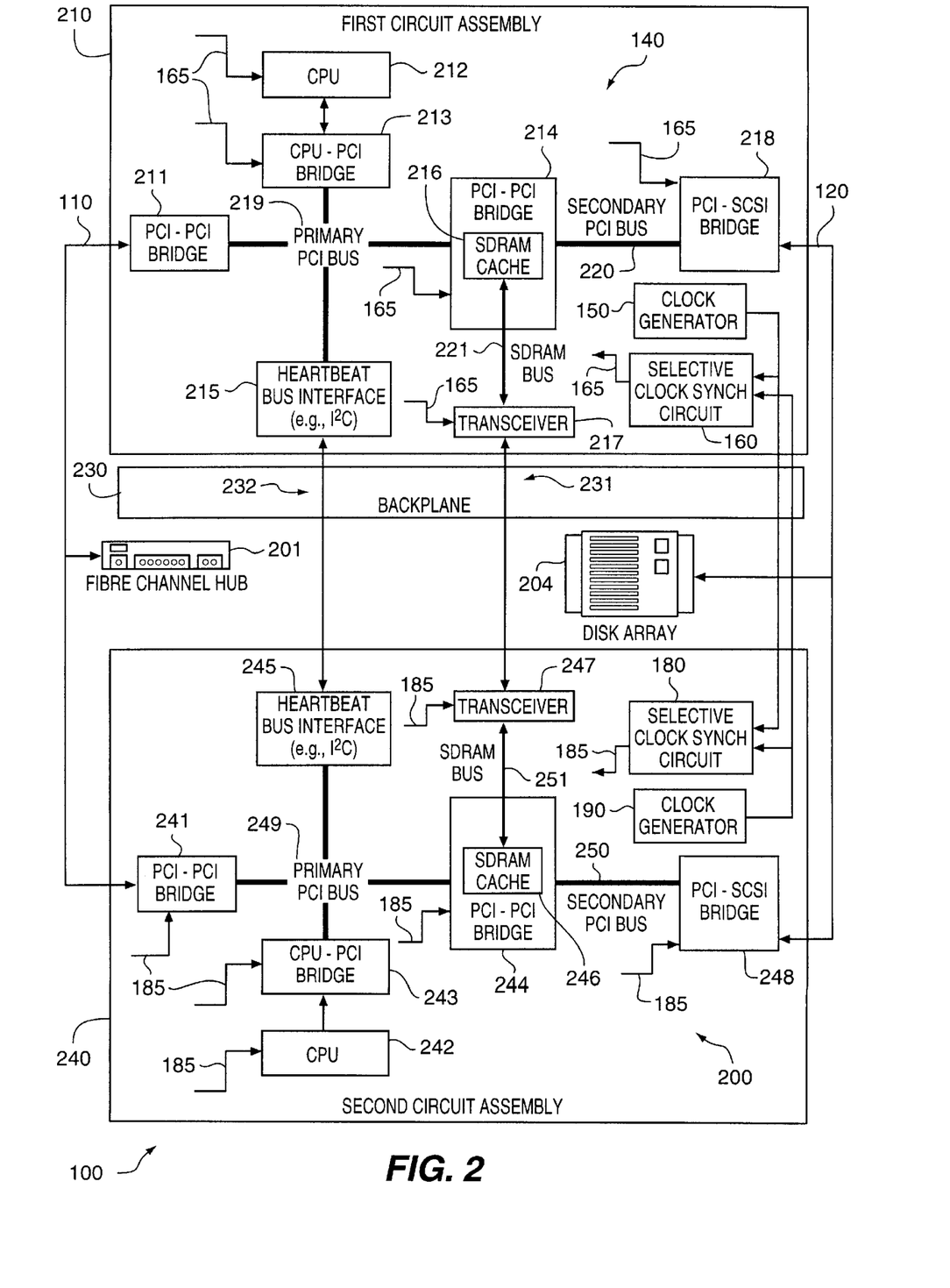
FIG. 2 illustrates another embodiment of a redundant bus bridge system according to the present invention.

In a respective one of the circuit assemblies 130, 170, a FC-PCI bridge 211, 241 provides connectivity between the FC bus 110 and a primary PCI bus 219, 249. A PCI-PCI bus bridge 214, 244 communicates between the primary PCI bus 219, 249 and a secondary PCI bus 220, 250 via an SDRAM cache 216, 246. A PCI-SCSI bridge 218, 248 provides connectivity between the secondary PCI bus 220, 250 and the SCSI bus 120 connected to the disk array 204. The SDRAM cache is connected to the PCI-PCI bus bridge 214, 244 by an SDRAM bus 221, 251, and caches information to be transferred between the primary PCI bus 219, 249 and the second PCI bus 220, 250.

A failover bus 231 is provided between the first and second circuit assemblies 130, 170 such that the bus bridge system 100 can maintain data transfers in the event of a single fault in one of the first and second circuit assemblies 130, 170, e.g. a component failure in or removal of one of the circuit assemblies 130, 170. A respective circuit assembly 130, 170 includes a communications circuit, here shown as including a transceiver 217, 247 connected to the SDRAM bus 221, 251, such that information cached in the circuit assembly's cache may be redundantly written to the cache of the other, "remote" circuit assembly. This allows information cached in a failed or removed circuit assembly to be recovered by retrieving the redundant information from the remote cache. The transceivers 217, 247 may comprise low voltage bidirectional registered transceivers implemented in so-called "LCX" low-power CMOS technology, such as the QS74LCX16646 transceivers manufactured by Quality Semiconductor, Inc. Failover operation of a bus bridge system of the type illustrated in FIG. 2 is described in detail in a U.S. patent application Ser. No. 09/062,279 entitled *"Fault Tolerant Redundant Bus Bridge Systems And Methods,"* by Khosrowpour, assigned to the assignee of the present application, filed concurrently herewith and incorporated herein by reference in its entirety as if the text were physically present.

A respective one of the circuit assemblies 130, 170 also includes circuitry that allows the assembly to monitor the status of another assembly. A "heartbeat" bus 232 is provided to communicate status information, such as identification or diagnostic information, between the first and second circuit assemblies 130, 170, via heartbeat bus interfaces 215, 245. The heartbeat bus 232 may comprise a serial bus, for example, with the heartbeat bus interfaces 215, 245 including electrically erasable programmable read-only memories (EEPROMs) which may be accessed by either of the controllers 140, 200 via the serial bus.

Communications between the SDRAM busses 221, 251 and over the heartbeat bus 232 may be controlled by central processing units (CPUs) 212, 242 on the first and second circuit assemblies 130, 170. A respective CPU 212, 242 may comprise a microprocessor, e.g., a Pentium®-class microprocessor, which communicates with devices on the primary PCI bus 219, 249 via a CPU-PCI bridge 213, 243. The addresses of the first and second controllers 140, 200 on the heartbeat bus 232 may be set by initialization software running on the CPUs 212, 242. For example, a respective circuit assembly 130, 170 may include means, such as circuitry that enables the CPU 212, 242 to identify a configuration resistor (not shown) disposed on the backplane 230, for determining the identity of the slot in the backplane 230 in which the controller is plugged.

On a respective one of the circuit assemblies 130, 170, the FC-PCI bridge 211, 241, the CPU 212, 242, the CPU-PCI bridge 213, 243, the PCI-PCI bridge 214, 244, the cache 216, 246, the transceiver 217, 147 and the PCI-SCSI bridge 218, 248 are generally responsive to the synchronized clock signal 165, 185. When both of the circuit assemblies 130, 170 are present and operational, communications between the first bus 110 and the second bus 120 via the FC-PCI bridge 211, 241, the primary PCI bus 219, 249, the PCI-PCI bridge 214, 244, the secondary PCI bus 220, 250 and the PCI-SCSI bridge 218, 248 thus are responsive to respect to the synchronized clock signal 165, 185 produced by the clock synchronizing circuit 160, 180, and accordingly, occur in synchronism with a selected one of the generated clock signals 155, 195. Similarly, communications between the circuit assemblies 130, 170 via the transceivers 217, 247 occur in synchronism with a selected one of the generated clock signals 155, 195. However, when one assembly, for example, the second circuit assembly 170, fails, is removed or otherwise becomes non-operational, the surviving first circuit assembly 130 operates off a synchronized clock signal 165 that is synchronized to its own internal generated clock signal 155.

Those skilled in the art will appreciate that the illustrated components of a respective one of the circuit assemblies 130, 170 may not necessarily directly operate from the synchronized clock signal 165, 185, but may also operate off of clock signals derived from the synchronized clock signal 165, 185. Those skilled in the art will also appreciate that the present invention may be employed to provide connectivity between busses other than FC or SCSI. It will also be understood that present invention could be used to provide bus bridge connectivity between sets of busses including multiple busses. For example, the SCSI bus 120 of FIG. 2 could include multiple busses connecting the bus bridge system 100 to a plurality of disks and/or disk arrays. In addition, it will be understood that the disk array 204 may include hardware, software or combinations thereof, such as an array of "physical" disks combined with one or more layers of array management software.

Figure 3:
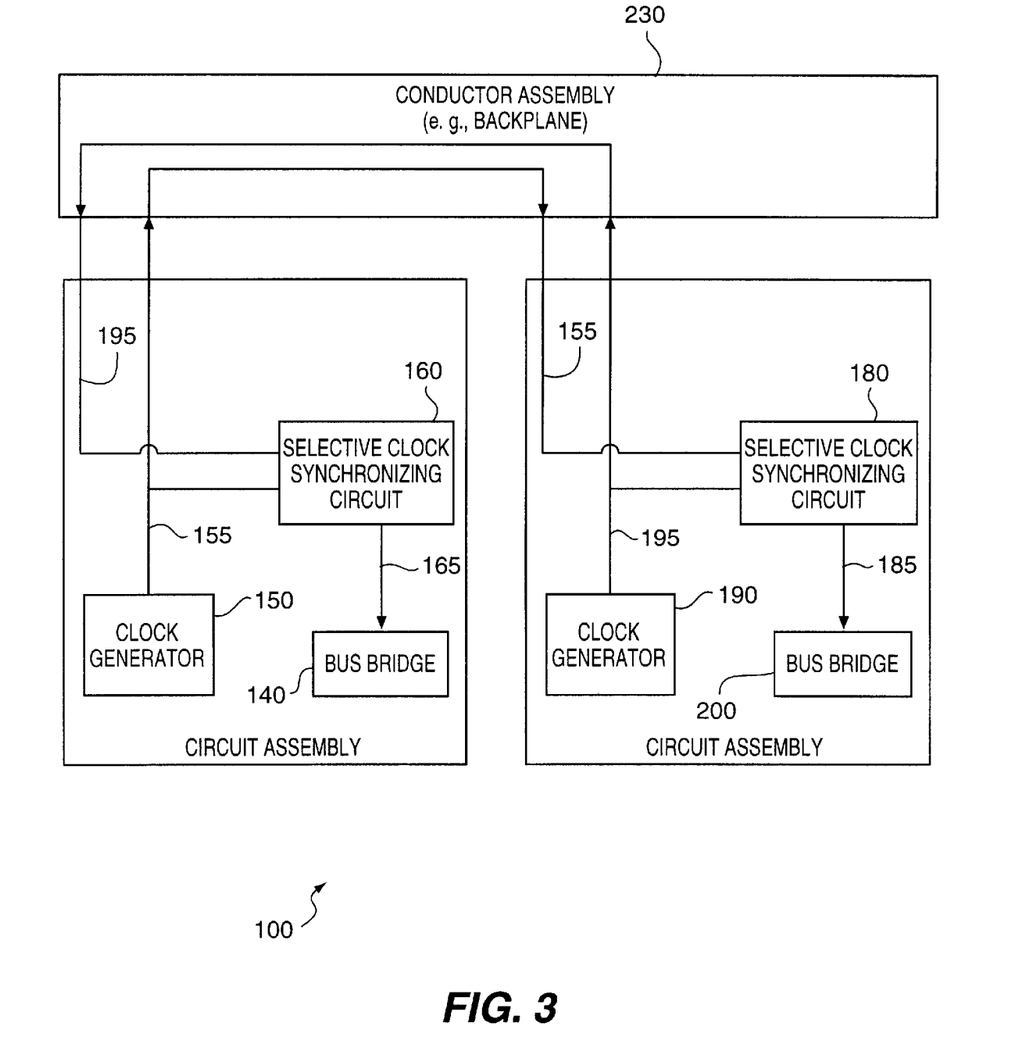
FIG. 3 illustrates another embodiment of a redundant bus bridge system according to the present invention.

FIG. 3 illustrates another aspect of the present invention. In a redundant bus bridge system 100, first and second circuit assemblies 130, 170 are releasably connected to a conductor assembly 230, e.g., a backplane. The conductor assembly 230 conveys the first clock signal 155 from the first circuit assembly 130 to the second circuit assembly 170. Similarly, the conductor assembly 230 conveys the second clock signal 195 from the second circuit assembly 170 to the first circuit assembly 130. The conductor assembly 230 that connects the first and second circuit assemblies 130, 170 and, in particular, the first and second selective clock synchronizing circuits 160, 180 therein, may serve as a single point of failure (SPOF). The conductor assembly 230 preferably is passive, e.g., a conductor assembly without active devices which may reduce reliability. Such a backplane typically has a high mean time between failures (MTBF), and thus may not unduly diminish overall system reliability.

Figure 4:
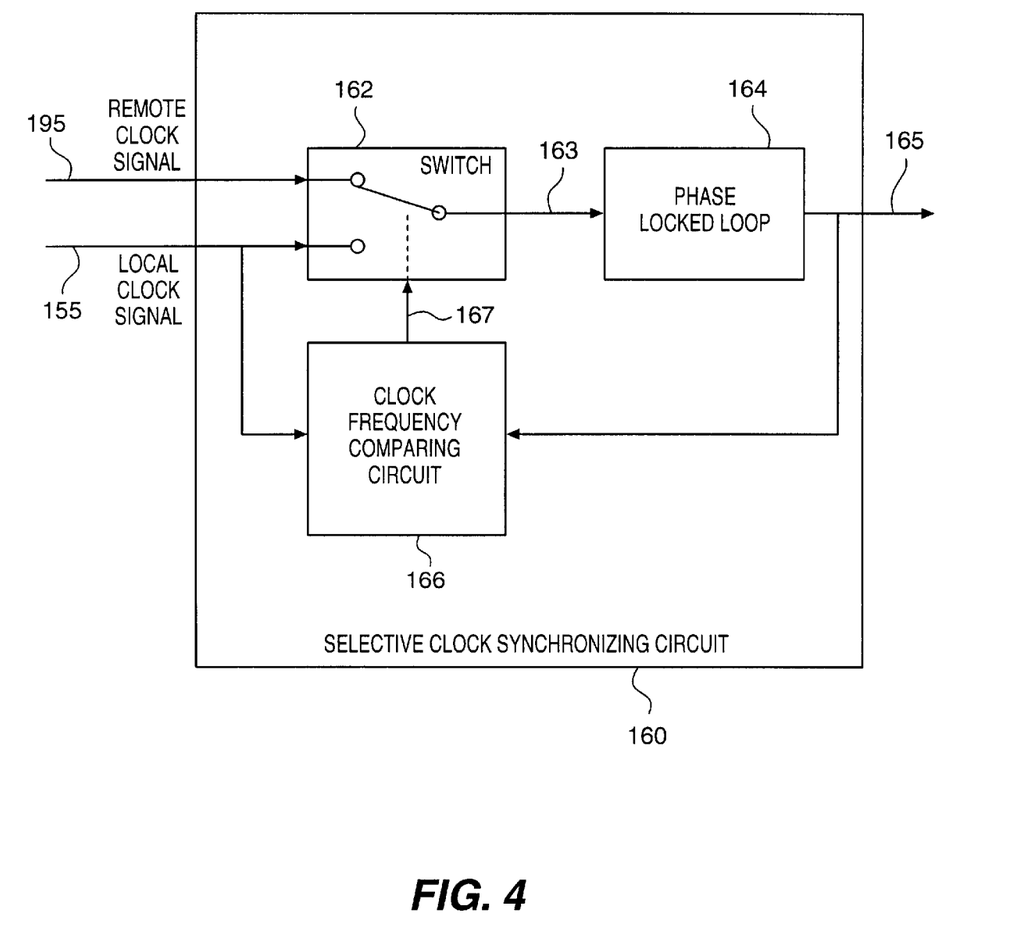
FIG. 4 illustrates a selective clock synchronizing circuit according to an aspect of the present invention.

FIG. 4 illustrates an embodiment of the selective clock synchronizing circuit 160 of FIGS. 1 and 2 according to another aspect of the present invention. The selective clock synchronizing circuit 160 includes a phase locked loop 164 that produces a synchronized clock signal 165 that is synchronized to a clock signal 163 applied thereto. A switch 162 is configured to receive a first clock signal 155, e.g., a clock signal generated locally on the same circuit assembly as the selective clock synchronizing circuit 160, and a second clock signal 195, e.g., a remote clock signal supplied to the circuit assembly on which the selective clock synchronizing circuit resides. The switch 162 selectively applies one of the first and second clock signals 155, 195 to the phase locked loop 164, responsive to a command signal 167 applied by a clock status determining circuit, here illustrated as including a clock frequency comparing circuit 166. The clock frequency comparing circuit 166 determines a status of the second (remote) clock signal 195 and generates the command signal 167 based on the determined status.

As illustrated in FIG. 4, the clock frequency comparing circuit 166 compares a frequency of the first (i.e., local) clock signal 155 to the frequency of the synchronized clock signal 165 produced by the phase locked loop 164 when the switch 162 is in the state shown. The clock frequency comparing circuit 166 may, for example, count the number of state transitions occurring in the synchronized clock signal 165 during a time window defined by a predetermined number of cycles of the first (local) clock signal 155. If, for example, the second clock signal 195 is absent, a zero frequency synchronized clock signal 165 will be produced by the phase locked loop 164 and the clock frequency comparing circuit will detect that an insufficient number of transitions have occurred in the synchronized clock signal 165 during the predetermined window defined by the first clock signal 155, thus indicating that the second clock signal 195 is invalid. In response, the clock frequency comparing circuit 166 asserts a command signal 167 appropriate to change the state of the switch 162 and thereby apply the first clock signal 155 to the phase locked loop 164. The source of an error detected by the clock frequency comparing circuit 166 could be ambiguous in a single-bridge system. However, in a redundant system including two or more bus bridge circuit assemblies as described here, should a clock frequency discrepancy be detected by the clock frequency comparing circuit 166 on a first circuit assembly due to a failure of the first clock signal 155, the source of the error could be detected by a second clock comparing circuit included in another bus bridge circuit assembly. In this manner, sufficient information can be provided to identify which of the clock signals 155, 195 is invalid.

Those skilled in the art will appreciate that the clock generators 150, 190 and the selective clock synchronizing circuits 160, 180 illustrated in FIGS. 1–3 may be implemented using a variety of hardware and/or software. For example, the functions of the switch 162 and the phase locked loop 164 of the clock synchronizing circuit 160 FIG. 3 may be implemented using an integrated clock driver circuit such as the MPC974 Clock Driver chip manufactured by Motorola, Inc. The functions of the clock generators 150, 190 may be implemented using an integrated clock generator chip, for example, an AV9155-36 Frequency Generator chip manufactured by Integrated Circuit Systems, Inc. Those skilled in the art will appreciate, however, that a variety of other circuits may be used to implement these functions, such as circuits including discrete integrated circuit devices, circuits including large-scale integrated circuits such as programmable logic devices (PLDs), application specific integrated circuits (ASICs), field programmable gate arrays (FPGAs) and the like, or combinations thereof.

Figure 5:
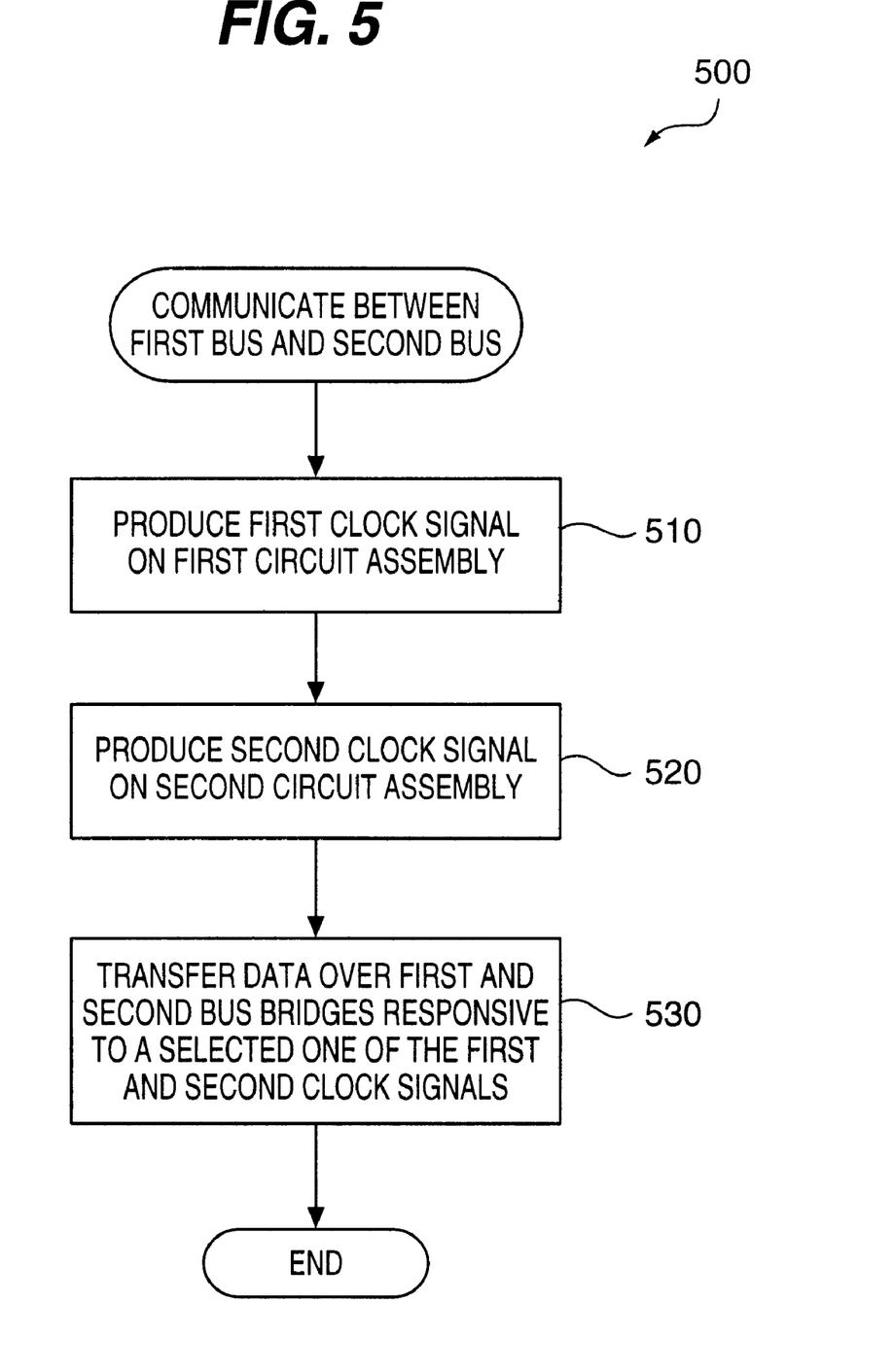
FIGS. 5–6 illustrate data transfer operations for a redundant bus bridge system according to aspects of the present invention.

FIG. 5 illustrates exemplary operations 500 for communicating between first and second busses using a redundant bus bridge system including first and second bus bridges included in respective first and second circuit assemblies. A first clock signal is generated on the first circuit assembly (Block 510) and a second clock signal is generated on the second circuit assembly (Block 520), using, for example, the first and second clock generators 150, 190 illustrated in FIGS. 1–3. Data is transferred over the first and second bus bridges in synchronism with a selected one of the first and second clock signals (Block 530).

Figure 6:
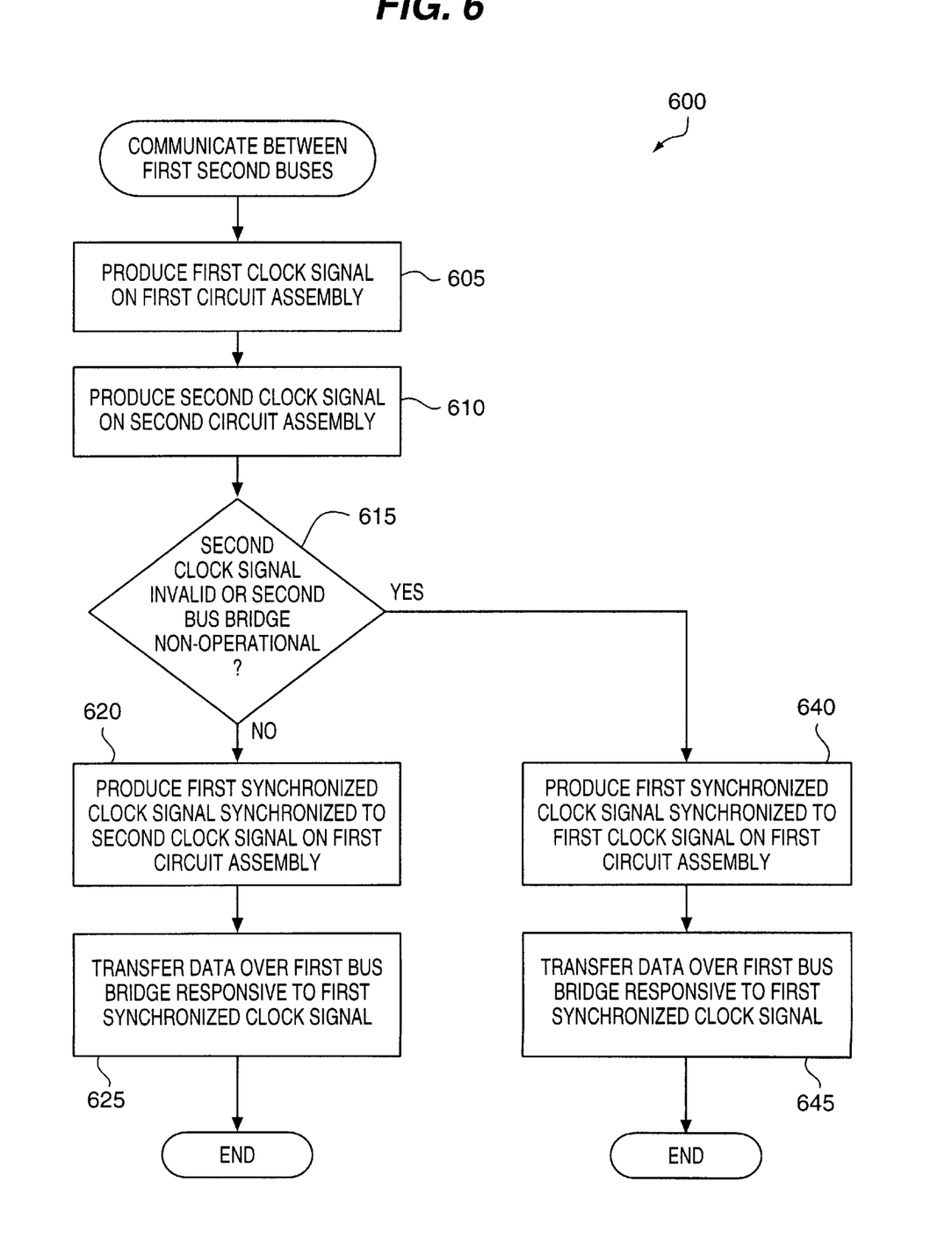

Exemplary communications operations 600 according to other method aspects of the present invention are illustrated in FIG. 6. A first clock signal is generated on the first circuit assembly (Block 605), and a second clock signal is generated on the second circuit assembly (Block 610). If the second clock signal is invalid or if the second bus bridge is non-operational (Block 615), a first synchronized clock signal synchronized to the first clock signal is produced on the first circuit assembly (Block 640), and data is transferred over the first bus bridge responsive thereto (Block 645), i.e., in synchronism with the first clock signal. If the second clock signal is valid and the second bus bridge is operational, however, the first synchronized clock signal is synchronized to the second clock signal (Block 620). Data is then transferred over the first bus bridge responsive to the first synchronized clock signal (Block 625), i.e., in synchronism with the second clock signal. Those skilled in the art will appreciate that additional operations and/or variations of the operations illustrated in FIGS. 5 and 6 may be performed according to the present invention.

In the drawings and specification, there have been disclosed embodiments of the invention. Although specific terms are employed, they are used in a generic and descriptive sense only and not for purposes of limitation, the scope of the invention being set forth in the following claims. It is expected that persons skilled in the art can and will make, use or sell alternative embodiments that are within the scope of the following claims either literally or under the Doctrine of Equivalents.

That which is claimed is:

1. A redundant bus bridge system for communicating between a first bus and a second bus, the system comprising:
   a first clock generator operative to produce a first clock signal;
   a second clock generator operative to produce a second clock signal;
   a first bus bridge connecting the first bus and the second bus and responsive to said first clock generator and said second clock generator, wherein said first bus bridge is operative to transfer data between the first bus and the second bus in synchronism with a selected one of said first clock signal and said second clock signal; and
   a second bus bridge connecting the first bus and the second bus and responsive to said first clock generator and said second clock generator, wherein said second bus bridge is operative to transfer data between the first bus and the second bus in synchronism with a selected one of said first clock signal and said second clock signal.

2. A system according to claim 1, wherein said first bus bridge is operative to transfer data between the first bus and the second bus in synchronism with said second clock signal when said second bus bridge is operational, and wherein said first bus bridge is operative to transfer data between the first bus and the second bus in synchronism with said first clock signal when said second bus bridge is non-operational.

3. A system according to claim 1, further comprising:
   a first selective clock synchronizing circuit configured to receive said first clock signal and said second clock signal and operative to produce a first synchronized clock signal synchronized to one of said first clock signal and said second clock signal; and
   a second selective clock synchronizing circuit configured to receive said first clock signal and said second clock signal and operative to produce a second synchronized clock signal synchronized to one of said first clock signal and said second clock signal; and
   wherein said first bus bridge is configured to receive said first synchronized clock signal and operative to transfer data between the first bus and the second bus responsive thereto; and
   wherein said second bus bridge is configured to receive said second synchronized clock signal and operative to transfer data between the first bus and the second bus responsive thereto.

4. A system according to claim 3, wherein said first selective clock synchronizing circuit is operative to synchronize said first synchronized clock signal to said second clock signal when said second bus bridge is operational, and wherein said first selective clock synchronizing means is operative to synchronize said first synchronized clock signal to said first clock signal when said second bus bridge is non-operational.

5. A system according to claim 3, wherein said first selective clock synchronizing circuit is operative to synchronize said first synchronized clock signal to said second clock signal when said second clock signal is valid and to synchronize said first synchronized clock signal to said first clock signal when said second clock signal is invalid.

6. A system according to claim 3, wherein said first selective clock synchronizing circuit comprises:
   a phase-locked loop configured to receive an applied clock signal and operative to synchronize said first synchronized clock signal thereto; and
   a switch configured to receive said first clock signal and said second clock signal and operative to selectively apply one of said first clock signal and said second clock signal to said phase-locked loop.

7. A system according to claim 6:
   wherein said first selective clock synchronizing circuit further comprises a clock status monitoring circuit operative to determine a status of said second clock signal and to produce a command signal in based on the determined status of said second clock signal; and
   wherein said switch is responsive to said command signal to apply one of said first clock signal and said second clock signal to said phase-locked loop.

8. A system according to claim 7, wherein said first clock signal has a first frequency, wherein said first synchronized clock signal has a second frequency, and wherein said clock status monitoring circuit comprises a clock comparing circuit operative to compare said first frequency and said second frequency to determine a status of said second clock signal.

9. A system according to claim 3, comprising:
   a first circuit assembly including said first bus bridge, said first clock generator and said first selective clock synchronizing circuit; and
   a second circuit assembly including said second bus bridge, said second clock generator and said second selective clock synchronizing circuit; and
   a conductor assembly connecting said first circuit assembly and said second circuit assembly such that said first clock signal is conveyed from said first circuit assembly to said second circuit assembly and said second clock signal is conveyed from said second circuit assembly to said first circuit assembly.

10. A system according to claim 9, wherein said conductor assembly comprises a backplane and wherein said first and second circuit assemblies are releasably connectable to said backplane.

11. A system according to claim 3 further comprising a data bus connecting said first bus bridge and said second bus bridge, and wherein said first bus bridge and said second bus bridge are operative to transfer data therebetween over said data bus in synchronism with a selected one of said first clock signal and said second clock signal.

12. A system according to claim 11:
   wherein said first bus bridge comprises a first cache responsive to said first synchronized clock signal and operative to cache data transfers between the first bus and the second bus;
   wherein said second bus bridge comprises a second cache responsive to said second synchronized clock signal and operative to cache data transfers between the first bus and the second bus; and
   wherein said data bus connects said first and second caches.

13. A system according to claim 12, further comprising:
   a first transceiver connecting said first cache and said data bus and operative to communicate between said first cache and said data bus responsive to said first synchronized clock signal; and
   a second transceiver connecting said second cache and said data bus and operative to communicate between said second cache and said data bus responsive to said second synchronized clock signal.

14. A system according to claim 3, wherein said first bus bridge and said second bus bridge comprise respective first and second RAID controllers.

15. A circuit assembly for a redundant bus bridge system that communicates between a first bus and a second bus, the circuit assembly comprising:

a clock generator operative to produce a local clock signal;

a selective clock synchronizing circuit configured to receive said local clock signal and an externally-supplied remote clock signal and operative to produce a synchronized clock signal synchronized to a selected one of said local clock signal and said remote clock signal; and a bus bridge connected to said selective clock synchronizing circuit and operative to transfer data between the first bus and the second bus responsive to said synchronized clock signal.

16. An assembly according to claim 15, wherein said selective clock synchronizing circuit is operative to synchronize said synchronized clock signal to said remote clock signal when said remote clock signal is valid and to synchronize said synchronized clock signal to said local clock signal when said remote clock signal is invalid.

17. An assembly according to claim 15, wherein said selective clock synchronizing circuit comprises:

a phase-locked loop configured to receive an applied clock signal and operative to synchronize said synchronized clock signal thereto; and a switch configured to receive said local clock signal and said remote clock signal and operative to selectively apply one of said local clock signal and said remote clock signal to said phase-locked loop.

18. An assembly according to claim 17:

wherein said selective clock synchronizing circuit further comprises a clock status monitoring circuit operative to determine a status of said remote clock signal and operative to produce a command signal based on the determined status of said remote clock signal; and wherein said switch is responsive to said command signal to apply one of said local clock signal and said remote clock signal to said phase-locked loop.

19. An assembly according to claim 18, wherein said local clock signal has a first frequency, wherein said synchronized clock signal has a second frequency, and wherein said clock status monitoring circuit comprises a clock comparing circuit operative to compare said first frequency and said second frequency to determine a status of said remote clock signal.

20. An assembly according to claim 15, wherein said bus bridge comprises a RAID controller.

21. In a redundant bus bridge system including a first and second bus bridges included in respective first and second circuit assemblies, a method of operating comprising the steps of:

generating a first clock signal on the first circuit assembly;

generating a second clock signal on the second circuit assembly; and transferring data over the first bus bridge and the second bus bridge in synchronism with a selected one of the first clock signal and the second clock signal.

22. A method according to claim 21, comprising the steps of:

transferring data over the first bus bridge in synchronism with the second clock signal when the second bus bridge is operational; and transferring data over the first bus bridge in synchronism with the first clock signal when the second bus bridge is non-operational.

23. A method according to claim 21, further comprising the steps of:

producing a first synchronized clock signal synchronized to one of the first clock signal and the second clock signal;

producing a second synchronized clock signal synchronized to one of the first clock signal and the second clock signal;

transferring data over the first bus bridge responsive to the first synchronized clock signal; and transferring data over the second bus bridge responsive to the second synchronized clock signal.

24. A method according to claim 23, comprising the steps of:

synchronizing the first synchronized clock signal to the second clock signal when the second bus bridge is operational; and synchronizing the first synchronized clock signal to the first clock signal when the second bus bridge is non-operational.

25. A method according to claim 23, comprising the steps of:

synchronizing the first synchronized clock signal to the second clock signal when the second clock signal is valid; and synchronizing the first synchronized clock signal to the first clock signal when said second clock signal is invalid.

26. A method according to claim 21, comprising the steps of:

determining a status of the second clock signal; and synchronizing the first synchronized clock signal to one of the first clock signal and the second clock signal based on the determined status of the second clock signal.

27. A method according to claim 26, wherein the first clock signal has a first frequency, wherein the first synchronized clock signal has a second frequency, and wherein said step of determining comprises the step of comparing the first frequency and the second frequency to determine a status of the second clock signal.

* * * * *